United States Patent
Yang et al.

(10) Patent No.: US 6,862,194 B2
(45) Date of Patent: Mar. 1, 2005

(54) FLYBACK POWER CONVERTER HAVING A CONSTANT VOLTAGE AND A CONSTANT CURRENT OUTPUT UNDER PRIMARY-SIDE PWM CONTROL

(75) Inventors: Ta-yung Yang, Milpitas, CA (US); Chern-Lin Chen, Taipei (TW); Jenn-yu G. Lin, Taipei (TW); Song-Yi Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 91 days.

(21) Appl. No.: 10/465,467

(22) Filed: Jun. 18, 2003

(65) Prior Publication Data

US 2004/0257833 A1 Dec. 23, 2004

(51) Int. Cl.⁷ .......................... H02M 3/335; H02M 7/04
(52) U.S. Cl. ...................... 363/16; 363/56.12; 363/80
(58) Field of Search .................... 363/16, 17, 21.1, 363/41, 95, 89, 20, 49, 80

(56) References Cited

U.S. PATENT DOCUMENTS

| | | | |
|---|---|---|---|
| 5,689,407 A | * 11/1997 | Marinus et al. | 363/21.15 |
| 5,901,051 A | * 5/1999 | Takahashi et al. | 363/21.18 |
| 5,982,640 A | * 11/1999 | Naveed et al. | 363/21.15 |
| 6,208,538 B1 | * 3/2001 | Halamik et al. | 363/41 |
| 6,233,161 B1 | 5/2001 | Balakrishnan et al. | |
| 6,366,479 B1 | * 4/2002 | Usui et al. | 363/21.12 |
| 6,434,021 B1 | 8/2002 | Collmeyer et al. | |
| 6,480,399 B2 | 11/2002 | Balakrishnan et al. | |
| 6,538,908 B2 | 3/2003 | Balakrishnan et al. | |

* cited by examiner

Primary Examiner—Rajnikant B. Patel
(74) Attorney, Agent, or Firm—J.C. Patents (57) ABSTRACT

A primary-side flyback power converter supplies a constant voltage and a constant current output. To generate a well-regulated output voltage under varying load conditions, the power converter includes a PWM controller. The PWM controller generates a PWM signal to control a switching transistor in response to a flyback voltage detected from the first primary winding of the power supply transformer. To reduce power consumption, the flyback energy of the first primary winding is used as a DC power source for the PWM controller. The flyback voltage is sampled following a delay time to reduce interference from the inductance leakage of the transformer. To generate a more accurate DC output voltage, a bias current is pulled from the detection input to form a voltage drop across a detection resistor for compensating for the voltage drop of the output rectifying diode.

22 Claims, 9 Drawing Sheets

FLYBACK POWER CONVERTER HAVING A CONSTANT VOLTAGE AND A CONSTANT CURRENT OUTPUT UNDER PRIMARY-SIDE PWM CONTROL

BACKGROUND OF THE INVENTION

1. Field of the Invention

The present invention relates to a switching mode power converter and more specifically relates to a flyback power converter.

2. Description of the Related Art

Flyback power converters are widely used in home appliances, battery chargers, and many other products. Considerable ongoing research is focused on making flyback power converters smaller, cheaper and even more efficient. A flyback power converter typically includes a PWM controller, a power MOSFET, a transformer, and a feedback-control circuit. The purpose of the feedback-control circuit is to sense the output voltage and/or the output current of the secondary side of the power supply, and to connect a feedback signal to the PWM controller through an isolated device such as an optical-coupler.

Figure 1:
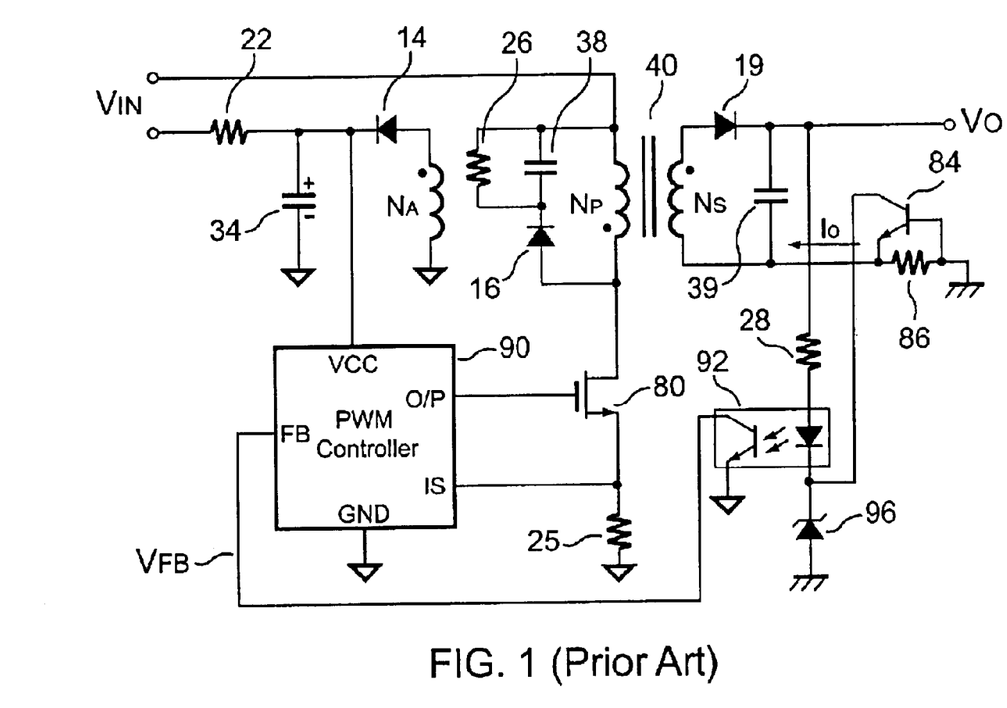
FIG. 1 shows a conventional flyback power converter.

FIG. 1 shows a traditional flyback power converter. Although the circuit is able to regulate the output voltage and the output current, it has several drawbacks. One drawback of this circuit is that the size of the flyback power converter cannot be easily reduced. It is difficult to reduce the size of the flyback power converter without eliminating the optical-coupler and the secondary feedback-control circuit. Another drawback of this flyback power converter is high power consumption. To maintain a constant current output from the secondary side, the circuit includes a current-sense resistor. However, the current-sense resistor increases the power consumption of the power converter.

In recent years, several primary-side control schemes for flyback power converters have been proposed. These prior-art primary-side control schemes have attempted in various ways to reduce the size and the cost of flyback power converters. One prior-art primary-side control scheme is "Switching power supply packages" by Arthur J. Collmeyer, Mark D. Telefus, Dickson T. Wong, and David B. Manner (U.S. Pat. No. 6,434,021.) Although the circuit is able to regulate the output voltage and the output current, it has several drawbacks.

One drawback of this prior-art invention is that the pulse train generator and the pulse rate controller vary the switching frequency in response to the load, which is unacceptable for some electronic appliances. Another drawback is that the feedback control voltage is sensed from a high voltage source. This method results in a loss of accuracy, and it increases the cost of the controller. Finally, the voltage drop of the output rectifier is not compensated for. Thus, the output voltage of this prior-art invention will deviate significantly from a constant DC level.

Another prior-art control scheme is "Method and apparatus providing a multi-function terminal for a power supply controller" by Balu Balakrishnan, Alex B. Djenguerian, and Leif O. Lund (U.S. Pat. No. 6,538,908.) The drawback of this prior art is that the optical-coupler and the secondary feedback circuit for loop control are still required. Otherwise, the output voltage and the output current will fluctuate significantly.

Reflected voltage control has also been proposed as a means for primary-side control. Two prior-art patents teaching this method include "Switched mode power supply responsive to voltage across energy transfer element" by Balu Balakrishnan, David Michael, and Hugh Matthews (U.S. Pat. No. 6,233,161) and "Switched mode power supply responsive to current derived from voltage across energy transfer element input" by Balu Balakrishnan, David Michael, Hugh Matthews (U.S. Pat. No. 6,480,399.)

One principal drawback of these two prior arts is inaccurate feedback control. In order to generate a feedback control signal, the reflected voltage of the transformer is filtered and turned into a DC voltage and/or current through a resistor-capacitor circuit. However, this reflected voltage includes not only the output voltage information, but also the spike voltage generated from the leakage inductance of the transformer. Thus, the output voltage of this prior-art invention will deviate significantly from a constant DC level. Furthermore, the voltage drop of the output rectifier is not compensated for in the feedback loop. When load changes occur, this problem will introduce additional distortion into the output voltage.

Another drawback of these two prior-art inventions is high power consumption. The reflected voltage is filtered to supply power for PWM control. However, the resistor of the filter burns the majority of the reflected power, even if PWM control only consumes a little power. Therefore the power consumption of the power supply is high.

Thus, a need still remains for an efficient primary-side flyback power converter with a well regulated, constant output voltage and output current.

SUMMARY OF THE INVENTION

A principal object of the present invention is to provide a flyback power converter under primary-side PWM control capable of supplying a well-regulated constant voltage and constant current output.

A further object of the present invention is to reduce the size of the flyback power converter that allows device count and reduces the cost of the power supply.

A further object of the present invention is to provide a flyback power converter that does not require a secondary-side feedback circuit and an optical-coupler.

A further object of the present invention is to solve the drawbacks of the foregoing prior-art inventions.

A further object of the present invention is to provide a flyback power converter with PWM power conversion, wherein the switching frequency is fixed under normal operating conditions.

A further object of the present invention is to provide a PWM controller with a power supply that has a low-voltage source so that the power consumption can be substantially reduced.

A further object of the present invention is to improve the DC output voltage accuracy and reduce the cost of the PWM controller. To achieve this, the present invention uses a low voltage input to detect the output voltage.

Another object of the present invention is to further improve DC output voltage accuracy by compensating for the voltage drop of the output rectifier. The present invention includes an improved flyback voltage detection circuit. The circuit reduces the interference from the leakage inductance of the transformer by introducing a timing delay during each sample cycle.

The primary-side PWM controller according to the present invention can provide a well-regulated output voltage and output current. This allows the device count, the size, and the cost of the power converter to be greatly reduced.

The flyback power converter according to the present invention includes a PWM controller that generates a PWM signal to drive a gate of a switching transistor. The PWM signal is generated in response to a flyback voltage sampled from a primary winding of the transformer by an internal voltage detection circuit.

According to one aspect of the present invention, the flyback energy from the primary winding of the transformer is recycled to reduce power consumption. After the falling-edge of the PWM signal, the flyback energy of the primary winding is rectified and filtered to supply DC power to the PWM controller. This flyback energy includes the flyback voltage reflected from the secondary winding and an induced voltage caused by the leakage inductance.

According to another aspect of the present invention, a pulse generator of the PWM controller generates a sampling pulse after a specific delay-time. The sampling pulse is used to accurately detect a flyback voltage from the first primary winding that is proportional to the output voltage. The delay-time is inserted to avoid interference from the induced voltage created by the leakage inductance of the transformer.

According to another aspect of the present invention, a blanking circuit produces a blanking time to ensure that the on-time of the PWM signal will create a sufficient delay to precisely sample the flyback voltage. This sampled voltage is used for voltage regulation.

According to another aspect of the present invention, in order to compensate for variations to the voltage drop across the output rectifier, a bias current-sink of the PWM controller pulls a bias current from a detection input of the PWM controller. In response to load changes, the bias current will produce a voltage drop across a detection resistor that is proportional to the voltage drop across the output rectifier. This way, it is possible to accurately regulate the output voltage using the flyback voltage of a primary-side transformer winding.

According to another aspect of the present invention, a V-limit generator in the PWM controller produces a limit voltage that controls the peak current of the primary winding, and thus controls the power delivered from the primary side of the transformer to the output of the power converter.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

FIG. 1 shows a traditional flyback power converter. A capacitor 34 is connected to a PWM controller 90. The capacitor 34 is charged via a resistor 22. The PWM controller 90 will be started up once its supply voltage $V_{CC}$ is higher than the start-threshold voltage. When the PWM controller 90 starts to operate, it will output a PWM signal to drive a MOSFET 80 and a transformer 40. Meanwhile, an auxiliary winding $N_A$ of the transformer 40 will supply the supply voltage $V_{CC}$ via a rectifier 14. A resistor 25 converts a switching current of the transformer 40 into a voltage signal for PWM control and over-power protection. An output of an optical-coupler 92 supplies the feedback voltage $V_{FB}$.

The output voltage $V_O$ and the Zener voltage of a Zener diode 96 drive an input of the optical-coupler 92 via a resistor 28 to complete the feedback loop. The magnitude of the feedback voltage $V_{FB}$ of the PWM controller 90 determines the on-time ($T_{ON}$) of the PWM signal and regulates the output power. A transistor 84 coupled with a current-limit resistor 86 control the maximum amplitude of the output current $I_O$. As the output current $I_O$ increases, so does the voltage across the current-limit resistor 86. When this voltage exceeds the junction voltage of the transistor 84 (eg, 0.7V), the transistor 84 will be turned on. This will reduce the on-time of the PWM signal by decreasing the feedback voltage $V_{FB}$. In this manner, the output current of the power supply can be kept constant.

Figure 2:
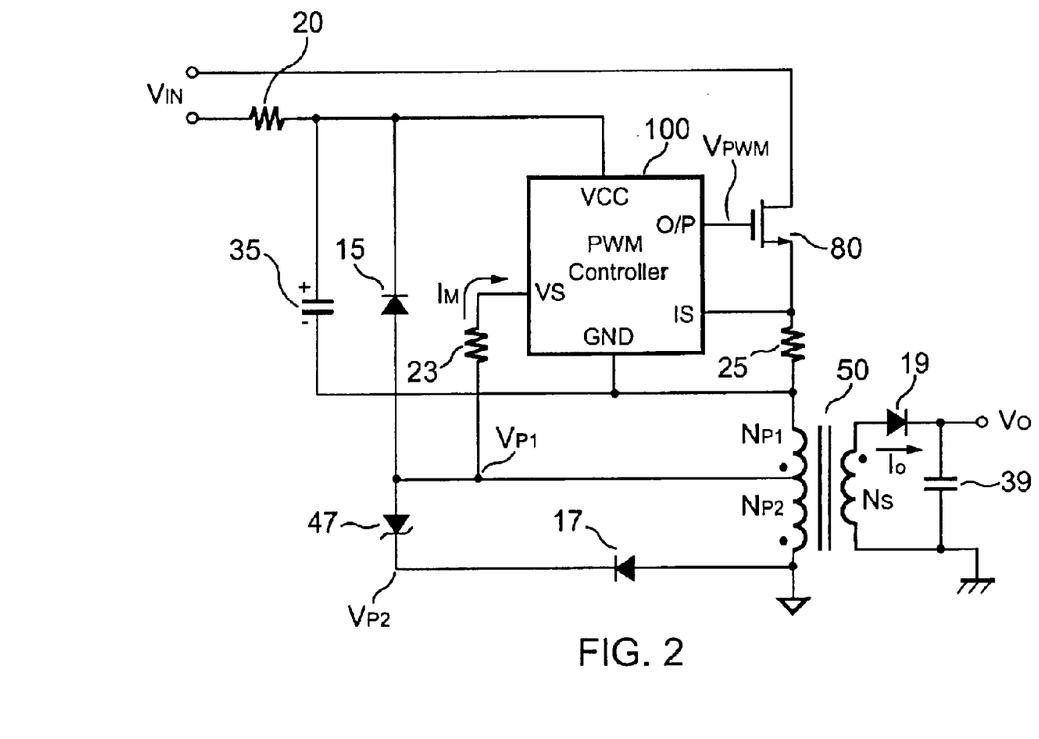
FIG. 2 shows a flyback power converter with primary-side PWM control according to a preferred embodiment of the present invention.

FIG. 2 shows a flyback power converter according to the present invention. The flyback power converter supplies a constant output voltage and a constant output current under primary-side PWM control. An input of the power converter $V_{IN}$ is connected to a drain of a switching transistor 80. A first primary winding $N_{P1}$ and a second primary winding $N_{P2}$ are connected in series to construct a primary winding of a transformer 50. A first terminal of the primary winding is a first terminal of the first primary winding $N_{P1}$, and a second terminal of the primary winding is a second terminal of the second primary winding $N_{P2}$. A second terminal of the first primary winding $N_{P1}$ is connected to a first terminal of the second primary winding $N_{P2}$. The transformer 50 further comprises a secondary winding $N_S$.

The secondary winding $N_S$ of the transformer 50 is connected to an output of the power converter via an output rectifier 19. A source of the switching transistor 80 is connected via a current-sense resistor 25 to the first terminal of the primary winding of the transformer 50. The second terminal of the primary winding is connected to a ground reference. When power is applied to the input $V_{IN}$ of the power converter, a capacitor 35 is charged up via a start-up resistor 20. The capacitor 35 is connected to a VCC input of a PWM controller 100. The capacitor 35 stores energy used by the PWM controller 100.

Once the voltage at a VCC input of the PWM controller 100 exceeds the start threshold voltage, the PWM controller 100 will start to operate and generate a PWM signal $V_{PWM}$. The signal $V_{PWM}$ will drive a gate of the switching transistor 80 for PWM control. At the instant the PWM signal turns off, a flyback voltage will be reflected from the secondary winding $N_S$ to the first primary winding $N_{P1}$ and the second primary winding $N_{P2}$. The voltage across the secondary winding is equal to the sum of the voltage drop across the output rectifier 19 and the output voltage $V_O$ of the flyback power converter.

The PWM controller 100 has a detection input VS for sampling the flyback voltage $V_{P1}$ from the first primary winding $N_{P1}$. This is used to regulate the output voltage $V_O$. The PWM controller 100 regulates the output voltage of the power converter by modulating the PWM signal in response to the voltage $V_S$ sampled at the detection input VS. While the PWM signal $V_{PWN}$ is on, the primary current of the transformer 50 will produce a current-sense voltage $V_{IS}$ across a current-sense resistor 25.

The current-sense resistor 25 is connected to a source of the switching transistor 80. The source of the transistor 80 is connected to a current-sense input IS of the PWM controller 100. The current-sense input IS detects a current-sense voltage $V_{IS}$, which is used to limit the peak primary current of the transformer 50. The amplitude of the peak primary current is limited in response to the voltage sampled at the detection input. Thus, the flyback power converter according to the present invention can successfully limit its output current.

An anode of a diode 15 is connected to the second terminal of the first primary winding $N_{P1}$. A cathode of the diode 15 is connected to the VCC input of the PWM controller 100. After the PWM signal $V_{PWM}$ turns off, the rectified flyback voltage of the first primary winding $N_{P1}$ is supplied to the VCC input via the diode 15. The capacitor 35 filters this rectified flyback voltage to supply the PWM controller 100 with a DC power source.

One component of the voltage supplied to the VCC input of the PWM controller 100 is from the flyback voltage reflected from the secondary winding $N_S$. However, the voltage supplied to the VCC input of the PWM controller 100 also includes an induced voltage from the leakage inductance of the transformer 50. This flyback energy of the first primary winding $N_{P1}$ of the transformer 50 is recycled to power the PWM controller 100, thus reducing power consumption.

The flyback energy of the second primary winding $N_{P2}$ of the transformer 50 is not utilized. Consequently, to eliminate the induced voltage caused by the leakage inductance of the second primary winding $N_{P2}$ of the transformer 50, a snubber circuit is connected in parallel with the second primary winding $N_{P2}$. The snubber circuit comprises a diode 17 connected in series with a voltage-clamping device 47. The voltage-clamping device can either be a Zener diode or a TVS (Transient Voltage Suppressor).

Figure 3:
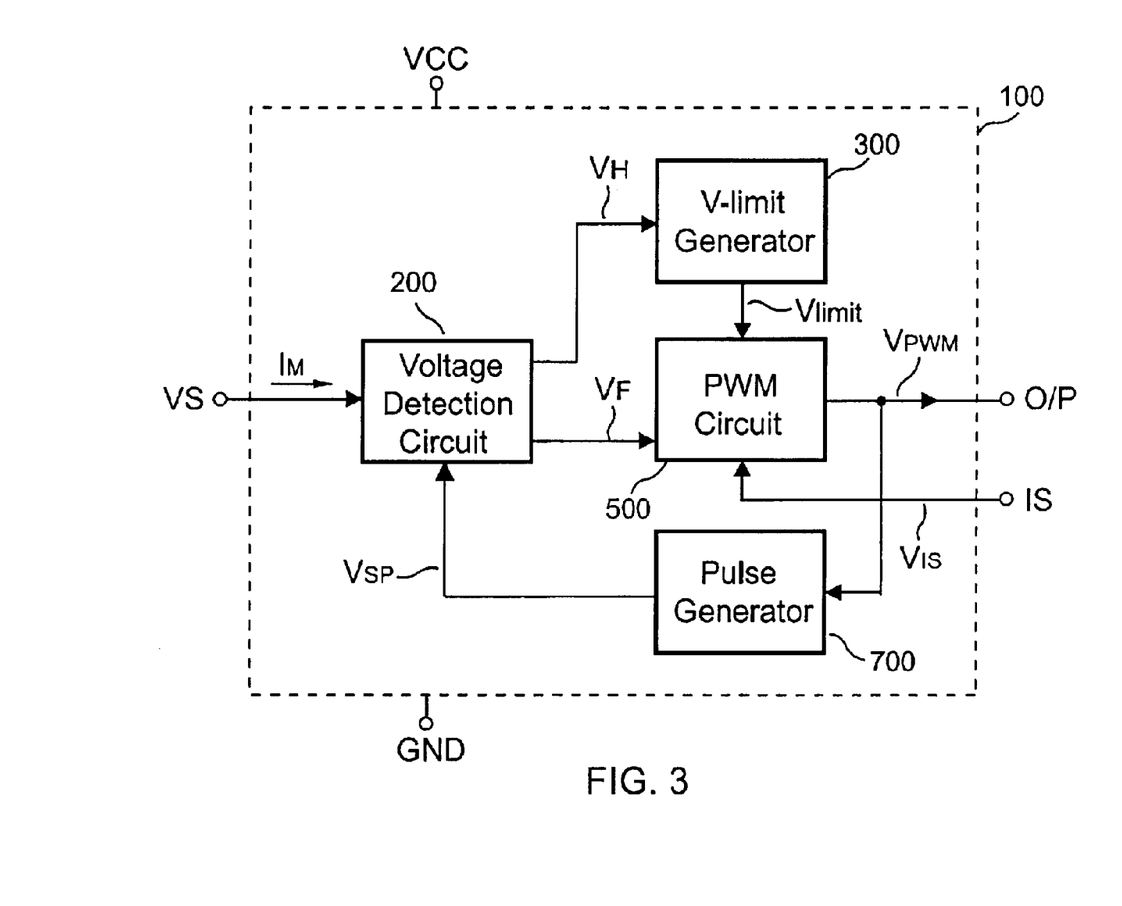
FIG. 3 shows a PWM controller according to a preferred embodiment of the present invention.

FIG. 3 shows a pulse generator 700 of the PWM controller 100. When the PWM signal is switched off, the pulse generator 700 generates a sampling pulse $V_{SP}$. The sampling pulse $V_{SP}$ is generated following a specific delay-time. The delay-time is chosen such that the flyback voltage of the first primary winding $N_{P1}$ of the transformer 50 can be sampled.

The delay-time is needed to avoid sampling the induced voltage from the leakage inductance of the transformer 50. The flyback voltage is sampled via a detection resistor 23 shown in FIG. 2.

The voltage sampled at the detection input VS is used for voltage regulation. One problem is that the voltage drop across the output rectifier 19 varies with respect to load conditions. In order to compensate for this, a bias current-sink of the PWM controller 100 pulls a bias current $I_M$ from the detection input VS. The bias current $I_M$ is modulated in proportion to the output load. The bias current $I_M$ will produce a voltage drop across the detection resistor 23 that is proportional to the voltage drop across the output rectifier 19.

By properly selecting the resistance of the detection resistor 23, it is possible to accurately offset the voltage drop across the output rectifier 19. When the voltage drop across the detection resistor 23 is correlated to the voltage drop across the output rectifier 19, the detection resistor 23 can adequately compensate for the voltage drop across the output rectifier 19. In this manner, the flyback power converter according to the present invention can supply a well-regulated output voltage under changing load conditions.

As shown in FIG. 3, a V-limit generator 300 in the PWM controller 100 produces a limit voltage $V_{limit}$. When the switching transistor 80 turns on, the primary current of the transformer 50 flows through the current-sense resistor 25 and produces a current-sense voltage across the current-sense resistor 25. The limit voltage $V_{limit}$ is proportional to the output voltage $V_O$. Using the limit voltage $V_{limit}$, the flyback power converter according to the present invention can maintain a constant output current $I_O$.

FIG. 3 shows the block diagram of the PWM controller 100 according to the present invention. The PWM controller 100 comprises a voltage detection circuit 200, the V-limit generator 300, a PWM circuit 500 and the pulse generator 700.

The PWM controller 100 generates the PWM signal $V_{PWM}$ from the feedback voltage $V_F$, the limit voltage $V_{limit}$, and the current-sense voltage $V_{IS}$. The PWM signal $V_{PWM}$ is used for PWM control. The PWM signal is operated such that the output voltage and the output current are both well regulated.

The voltage detection circuit 200 is used to sample the flyback voltage from the detection input VS. The voltage detection circuit 200 is also used for producing a hold voltage $V_H$ and a feedback voltage $V_F$. The hold voltage $V_H$ is the voltage sampled from the detection input of the PWM controller 100.

The V-limit generator 300 produces the limit voltage $V_{limit}$ in response to the hold voltage $V_H$. The limit voltage $V_{limit}$ is used to limit the peak primary current of the transformer.

The pulse generator 700 generates the sampling pulse $V_{SP}$ for the voltage detection circuit 200. The sampling pulse $V_{SP}$ is used to sample the flyback voltage. Sampling is controlled by the PWM signal $V_{PWM}$.

Figure 4:
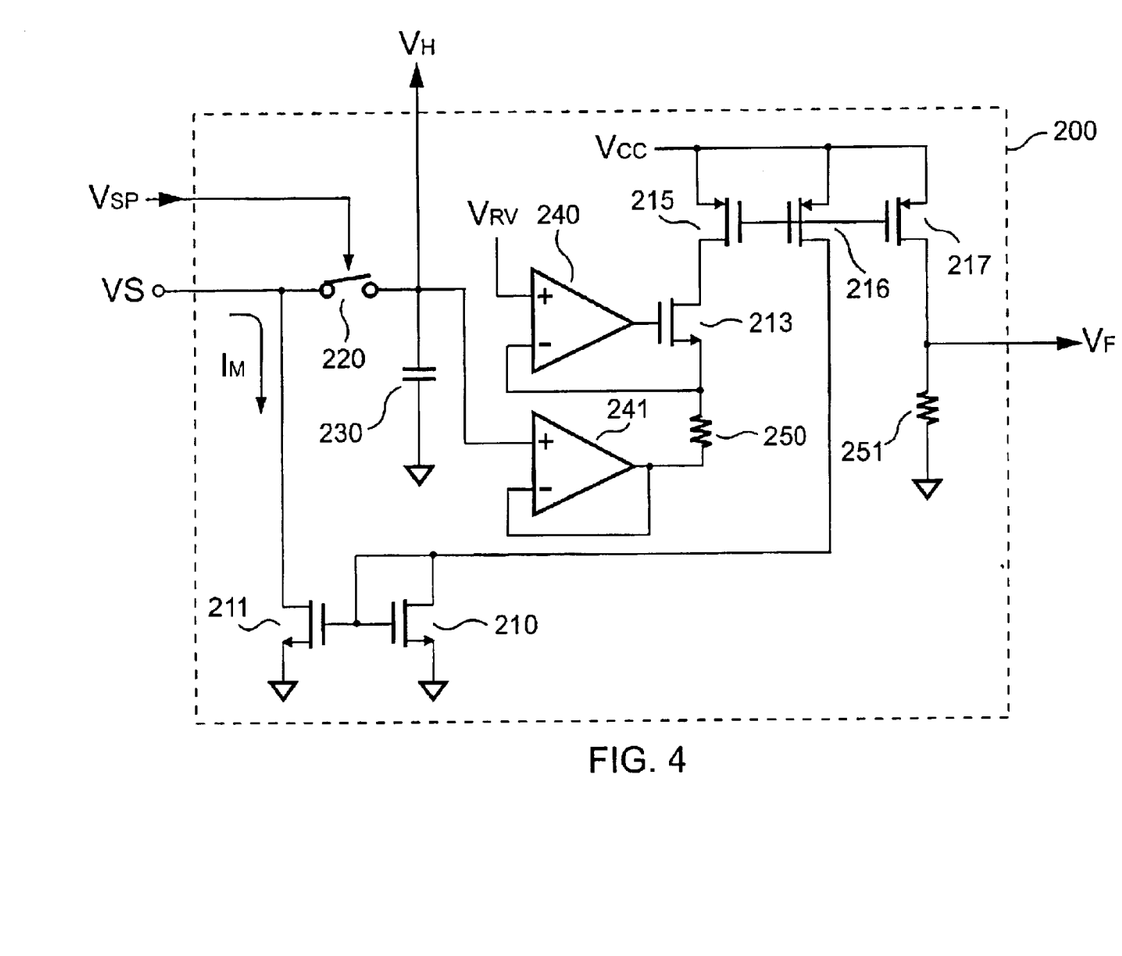
FIG. 4 shows a voltage-detection circuit of the PWM controller according to a preferred embodiment of the present invention.

FIG. 4 shows the voltage detection circuit 200 of the PWM controller 100 according to a preferred embodiment of the present invention. In this embodiment, the VS input is connected to an input terminal of a switch 220. The switch 220 is turned on/off by the sampling pulse $V_{SP}$. An output terminal of the switch 220 is connected to a capacitor 230 to produce a hold voltage $V_H$. The capacitor 230 is further connected to a positive terminal of an operational amplifier 241. An output of an operational amplifier 240 drives a gate of a transistor 213. A negative terminal of the operational amplifier 240 is connected to a source of the transistor 213. A positive terminal of the operational amplifier 240 is connected to a reference voltage $V_{RV}$. A negative terminal and an output of the operational amplifier 241 are connected together. The source of the transistor 213 is further connected to the output of the operational amplifier 241 via a resistor 250.

A drain of the transistor 213 is connected to a current mirror. The current mirror comprises a transistor 215, a transistor 216, and a transistor 217. The transistor 215 is an input of the current mirror. A drain of the transistor 217 is connected to a resistor 251 to produce the feedback voltage $V_F$. A drain of the transistor 216 is connected to an input of a bias current sink. The bias current sink comprises a transistor 210 and a transistor 211. A drain of the transistor 210 is the input of the bias current sink. To pull the bias current $I_M$, the detection input VS is connected to a drain of the transistor 211. The bias current $I_M$ is created to be proportional to the feedback voltage $V_F$. The feedback voltage $V_F$ is inversely proportional to the output voltage. Therefore, the amplitude of the bias current $I_M$ is also proportional to the output load.

Figure 5:
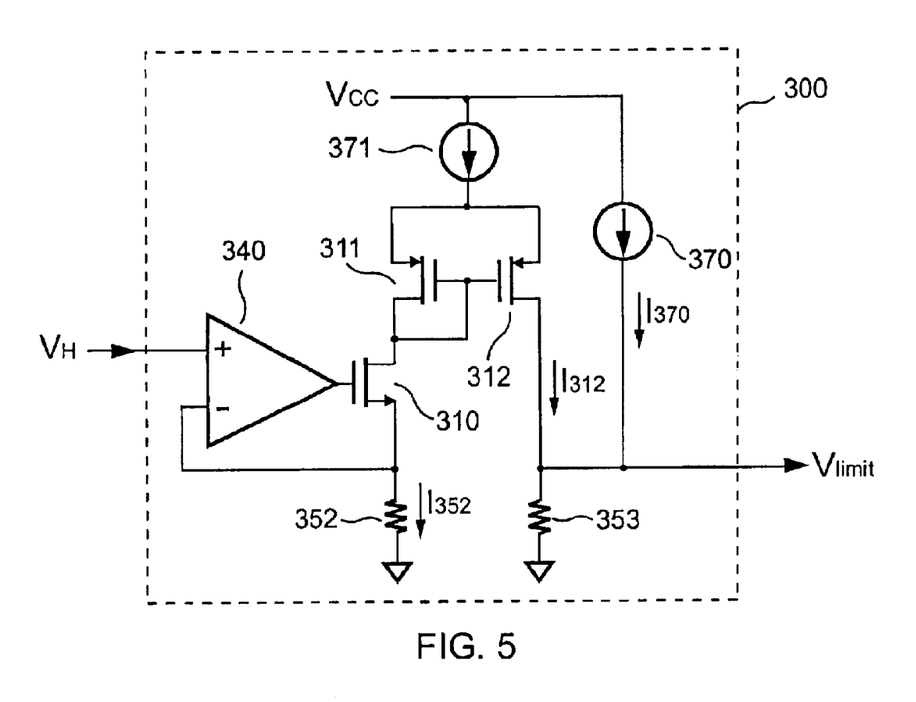
FIG. 5 shows a V-limit generator of the PWM controller according to a preferred embodiment of the present invention.

FIG. 5 shows the V-limit generator 300 of the PWM controller 100 according to a preferred embodiment of the present invention. In this embodiment, the hold voltage $V_H$ is supplied to a positive terminal of an operational amplifier 340. The operational amplifier 340 is coupled to a transistor 310 and a resistor 352, to generate a first limit current $I_{352}$. A transistor 311 paired with a transistor 312 produce a second-limit current $I_{312}$ by mirroring the first-limit current $I_{352}$. The pair of transistors 311 and 312 is supplied with a first current source 371. The maximum amplitude of the sum of the first limit current $I_{352}$ and the second-limit current $I_{312}$ is limited by the first current source 371. The second-limit current $I_{312}$ combines with a current supplied by a second current source 370 to generate the limit voltage $V_{limit}$ across a resistor 353. Therefore the limit voltage $V_{limit}$ is produced in proportion to the magnitude of the hold voltage $V_H$. The limit voltage $V_{limit}$ can be expressed as, $$V_{limit} = R_{353} \times \left( I_{370} + K_i \times \frac{V_H}{R_{352}} \right) \quad (1)$$

where $R_{353}$ and $R_{352}$ are the resistances of the resistors 352, 353 respectively, $K_I$ is the geometrical ratio of the transistors 311 and 312, and $I_{370}$ is the current supplied by the current source 370.

Figure 6:
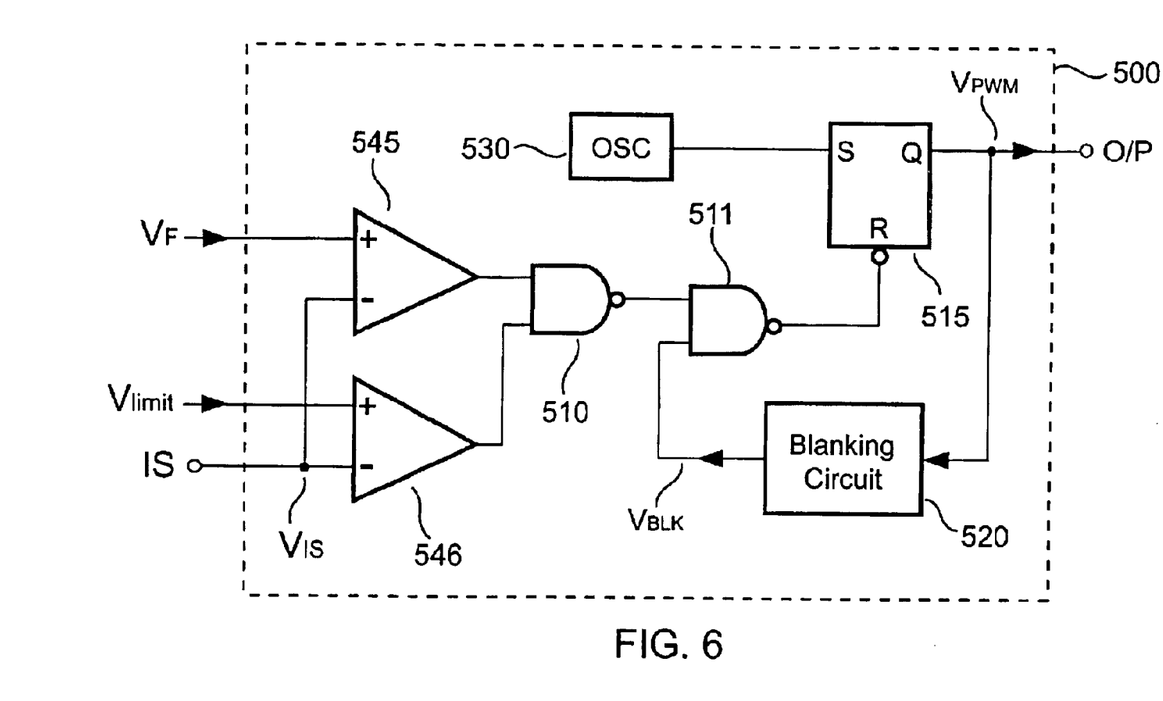
FIG. 6 shows a PWM circuit of the PWM controller according to a preferred embodiment of the present invention.

FIG. 6 shows the PWM circuit 500 of the PWM controller 100 according to a preferred embodiment of the present invention, wherein the PWM circuit 500 comprises two comparators 545 and 546, two NAND gates 510 and 511, a flip-flop 515, an oscillator 530, and a blanking circuit 520. The current-sense input IS is connected to a negative terminal of the comparator 545 and a negative terminal of the comparator 546. The comparator 545 is used to compare the feedback voltage $V_F$ with the current-sense voltage $V_{IS}$. The comparator 546 is used to compare the limit voltage $V_{limit}$ with the current-sense voltage $V_{IS}$. An output of the comparator 545 is connected to a first input of the NAND gate 510. An output of the comparator 546 is connected to a second input of the NAND gate 510. A first input of the NAND gate 511 is connected to an output of the NAND gate 510. A second input of the NAND gate 511 is connected to an output of the blanking circuit 520. The oscillator 530 generates a clock signal to set the flip-flop 515. The flip-flop 515 is reset by an output of the NAND gate 511. The flip-flop 515 supplies a PWM signal $V_{PWM}$ to an input of the blanking circuit 520. The blanking circuit 520 generates a blanking signal $V_{BLK}$ to ensure a minimum on-time for the PWM signal $V_{PWM}$, once the PWM signal is turned-on.

Figure 7:
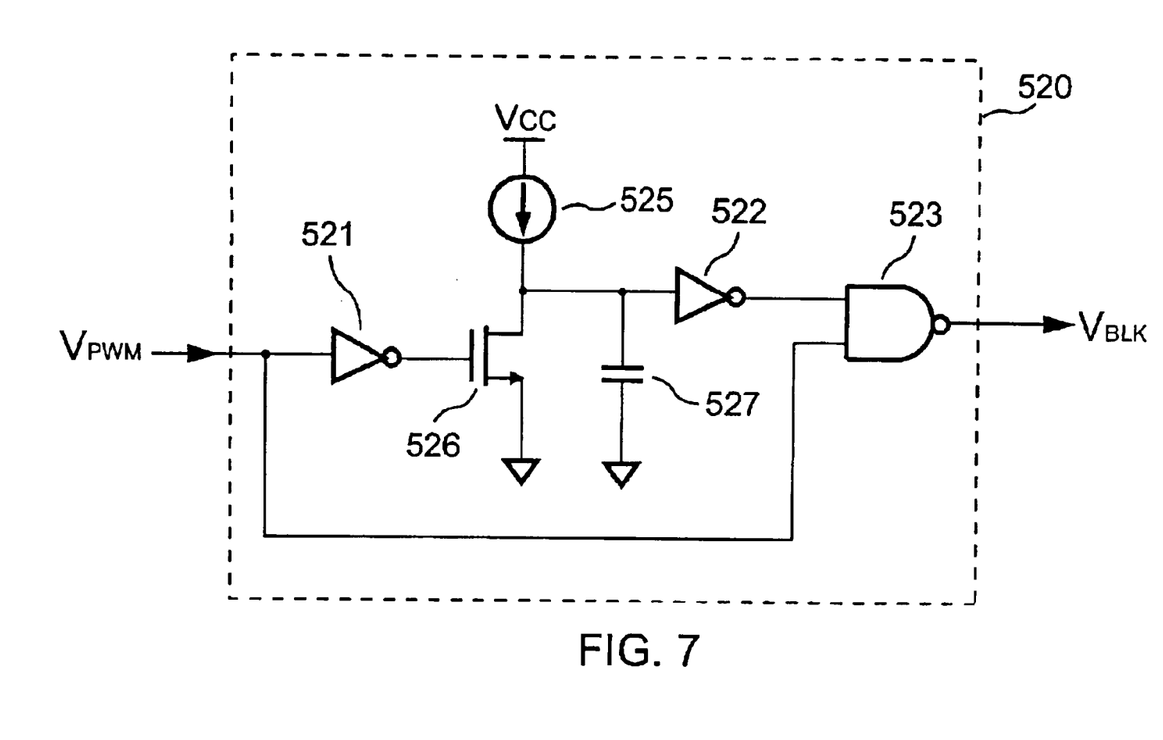
FIG. 7 shows a blanking circuit of the PWM circuit according to a preferred embodiment of the present invention.
Figure 9:
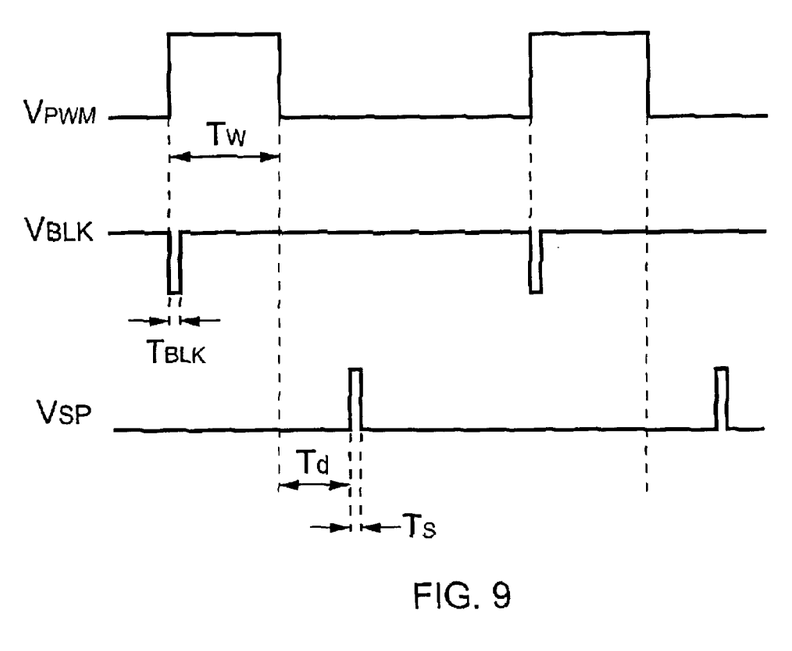
FIG. 9 is a timing diagram showing signals generated by the PWM circuit and the pulse generator according to a preferred embodiment of the present invention.

FIG. 7 shows the blanking circuit 520 of the PWM circuit 500 according to a preferred embodiment of the present invention. The blanking circuit 520 comprises an inverter 521, an inverter 522, a NAND gate 523, a transistor 526, a capacitor 527, and a current source 525. The purpose of the blanking circuit 520 is to generate the blanking signal $V_{BLK}$. The PWM signal $V_{PWM}$ is supplied to an input of the inverter 521 and a first input of the NAND gate 523. The transistor 526 is coupled with the current source 525, the capacitor 527, and the inverter 522, to produce a blanking time $T_{BLK}$. An output of the inverter 521 drives a gate of the transistor 526 to start the blanking time $T_{BLK}$, once the PWM signal is turned-on. An output of the inverter 522 is connected to a second input of the NAND gate 523. An output of the NAND gate 523, which is an output of the blanking circuit 520, generates the blanking signal $V_{BLK}$. Its waveform is shown in FIG. 9.

Figure 8:
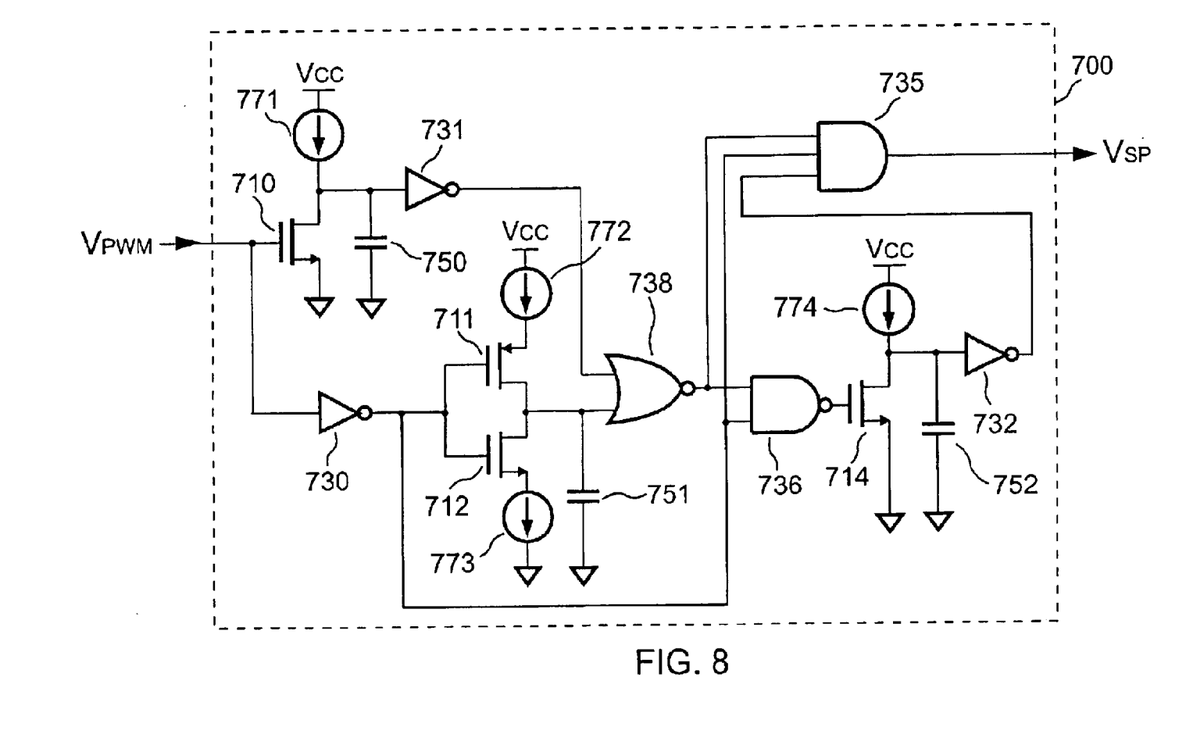
FIG. 8 shows a pulse generator of the PWM controller according to a preferred embodiment of the present invention.

FIG. 8 shows the pulse generator 700 of the PWM controller 100 according to a preferred embodiment of the present invention. To produce a minimum delay time $T_{d(min)}$, the pulse generator 700 includes a transistor 710, a current source 771, a capacitor 750, and an inverter 731. To produce an off-time delay, the pulse generator 700 includes an n-transistor 712, a p-transistor 711, a current source 772, a current source 773, and a capacitor 751. The off-time delay is produced so that it is proportional to the on-time of the PWM signal $V_{PWM}$. To produce a sample time Ts, the pulse generator 700 includes a transistor 714, a current source 774, a capacitor 752 and an inverter 732.

The PWM signal $V_{PWM}$ is supplied to a gate of the transistor 710 and an input of an inverter 730. When the PWM signal $V_{PWM}$ is on, the p-transistor 711 is also turned-on. The current source 772 then charges the capacitor 751 to produce a charge time. When the PWM signal $V_{PWM}$ is turned-off, the n-transistor 712 is then turned-on. The capacitor 751 is then discharged by the current source 773 to produce a discharge time that is proportional to the charge time.

An output of the inverter 731 is connected to a first input of a NOR gate 738. A second input of the NOR gate 738 is coupled to the capacitor 751. An output of the NOR gate 738 is connected to a first input of an AND gate 735 and a first input of a NAND gate 736. An output of the inverter 730 drives a second input of the NAND gate 736 and a second input of the NAND gate 735. An output of the NAND gate 736 is connected to a gate of the transistor 714 to control the start of the sample time Ts. An output of the inverter 732 drives a third input of the AND gate 735. An output of the AND gate 735 outputs the sampling pulse $V_{SP}$ with a pulse width equal to the sample time Ts.

FIG. 9 shows the timing diagram of the PWM circuit 500 and the pulse generator 700. After the PWM signal goes low, the sampling pulse $V_{SP}$ is generated, following a delay time $T_d$. In this case, the delay time $T_d$ can be the off-time delay. However, if the off-time delay is less than the minimum delay time $T_{d(min)}$, then the delay time $T_d$ will be determined by the minimum delay time $T_{d(min)}$. The purpose of the delay time is to eliminate as much as possible the influence of the leakage inductance of the transformer 50. To accomplish this, the delay time $T_d$ is inserted during each cycle between the falling-edge of the PWM signal $V_{PWM}$ and the beginning of the flyback voltage sampling process.

The blanking circuit 520 shown in FIG. 6 produces a blanking time $T_{BLK}$ that determines the minimum on-time of the PWM signal, once the PWM signal is on. The minimum delay time $T_{d(min)}$ is determined by the minimum on-time of the PWM signal.

The blanking time $T_{BLK}$ ensures that the delay time $T_d$ and the sample time $T_S$ will be sufficient to precisely sample the flyback voltage.

Referring to FIG. 2, the output voltage $V_O$ of the power converter can be expressed as, $$V_O = V_{NS} - V_d = \frac{N_S}{N_{P1}} \times V_{P1} - V_d = \frac{N_S}{N_{P1}} \times (V_H + I_M \times R_{23}) - V_d \quad (2)$$

where $V_{NS}$ is the voltage across the secondary winding, $V_{P1}$ is the voltage of the first primary winding, $V_d$ is the voltage drop across the output rectifier 19, and $R_{23}$ is the resistance of the resistor 23.

The output voltage $V_O$ can also be expressed in terms of the PWM feedback-control circuit:

$$V_O = G_m \times (V_{RV} - V_H) \quad (3)$$

where $G_m$ is the loop gain of the PWM feedback-control circuit and $V_{RV}$ is the reference voltage of the voltage detection circuit 200. Based on equations (2) and (3), the output voltage can be rewritten as, $$V_O = \left\{ \frac{N_S}{N_{P1}} \times V_{RV} + \left[ \left( \frac{N_S}{N_{P1}} \times I_M \times R_{23} \right) - V_d \right] \right\} \div \left\{ 1 + \left( \frac{N_S}{N_{P1}} \times \frac{1}{G_m} \right) \right\}$$

Because $G_m \gg 1$, $V_O$ can be expressed in a simplified form as, $$V_O = \frac{N_S}{N_{P1}} \times V_{RV} + \left[ \left( \frac{N_S}{N_{P1}} \times I_M \times R_{23} \right) - V_d \right] \quad (4)$$

The problem is, that the voltage drop across the output rectifier 19 varies with respect to the output load. To compensate for this, the present invention introduces a bias current $I_M$. The bias current $I_M$ is modulated in proportion to the feedback voltage $V_F$ and in proportion to the load. By properly selecting the resistance of the resistor 23, it is possible to offset the adverse effect of the voltage drop across the output rectifier 19. Thus, the flyback power converter according to the present invention can supply a well-regulated output voltage $V_O$.

The V-limit generator 300 produces the limit voltage $V_{limit}$ to control the peak current through the primary winding. In this manner, the V-limit generator 300 also controls the power delivered from the primary side of the transformer 50 to the output of the power converter. As shown in equations (1) and (2), $V_{limit}$ is a function of the hold voltage $V_H$. The hold voltage $V_H$ is itself a function of the output voltage $V_O$. Therefore, the output voltage $V_O$ of the power converter determines the limit voltage $V_{limit}$.

Since the output power is a function of the output voltage $V_O$, a constant current output can be achieved when the output current of the power converter is always greater than a maximum value. The output power $P_O$ is given by, $$P_O = V_O \times I_O = \eta \times P_{IN} = \eta \times \frac{1}{2 \times T} \times L_P \times I_P^2 \quad (5)$$

where $P_{IN}$ is the power input to the primary side, is the power conversion efficiency, T is the period of the switching frequency, $L_P$ is the primary inductance of the transformer 50, and $I_P$ is the primary current of the transformer 50.

The primary current $I_P$ produces the current-sense voltage $V_{IS}$ across the resistor 25, which is connected to the IS input of the PWM controller 100. Once the current-sense voltage $V_{IS}$ is higher than the limit voltage $V_{limit}$, the logic circuit of the PWM controller will turn off the PWM signal to restrict the value of the primary current $I_P$. In this manner, the limit voltage $V_{limit}$ and the resistor 25 regulate the primary current $I_P$. Referring to equation (5), the output current $I_O$ of the power converter can be shown as, $$I_O = \frac{1}{V_O} \times \frac{\eta}{2 \times T} \times L_P \times \left( \frac{V_{limit}}{R_{25}} \right)^2 \quad (6)$$

where $R_{25}$ is the resistance of the resistor 25.

In order to produce a constant output current $I_O$, when $V_{O2} = 0.5 \times V_{O1}$ ($P_{O2} = 0.5 \times P_{O1}$), $V_{limit}$ should be reduced according to the following equations:

$$V_{limit2}^2 = 0.5 \times V_{limit1}^2$$

$$V_{limit2} = 0.707 \times V_{limit1}^2$$

where the first limit voltage $V_{limit1}$ refers to the first output voltage $V_{O1}$ and the second limit voltage $V_{limit2}$ refers to the second output voltage $V_{O2}$.

The V-limit generator 300 generates the limit voltage $V_{limit}$ from the hold voltage $V_H$. Referring to equation (2), the hold voltage $V_H$ is itself a function of the output voltage $V_O$. Therefore, a constant output current can be easily achieved by reducing the limit voltage to $(0.707 \times V_{limit})$, whenever the output voltage is decreased to $(0.5 \times V_O)$.

As described above, the flyback power converter includes the PWM controller 100 to generate the bias current $I_M$ and the hold voltage $V_H$. The hold voltage $V_H$ and the bias current $I_M$ are generated by sampling the voltage across the first primary winding during every PWM cycle. In this manner, the flyback power converter according to the present invention can keep the output voltage constant. To limit the peak current through the primary winding, the limit voltage $V_{limit}$ is generated in response to the output voltage $V_O$. In this manner, the flyback power converter according to the present invention can keep the output current constant.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flyback power converter, comprising:
   a transformer having a secondary winding, a first primary winding, and a second primary winding, said first primary winding and said second primary winding each having a first terminal and a second terminal respectively, wherein said second terminal of said first primary winding is connected to said first terminal of said second primary winding, wherein said second terminal of said second primary winding is connected to a ground reference;
   an output rectifier connected from said secondary winding to an output of the flyback power converter;
   a switching transistor for controlling the voltage across the primary windings of the flyback power converter, wherein a drain of said switching transistor is connected to an input of the flyback power converter;

a current-sense resistor for generating a current-sense voltage, wherein said current-sense resistor is connected between a source of said switching transistor and said first terminal of said first primary winding;

a PWM controller for providing a PWM signal to drive a gate of said switching transistor, wherein said PWM controller has a VCC input for receiving power, a detection input for receiving a flyback voltage, a current-sense input for current detection, and a GND input connected to the first terminal of said first primary winding, wherein said current-sense input is connected to said source of said switching transistor;

a power-pin capacitor for starting up said PWM controller, wherein said power-pin capacitor is connected between said VCC input and said GND input of said PWM controller;

a start-up resistor for charging said power-pin capacitor, wherein said start-up resistor is connected from the input of the power converter to said VCC input of said PWM controller;

a power-pin diode connected from said second terminal of said first primary winding to said VCC input of said PWM controller;

a detection resistor for receiving a bias current to compensate for the voltage drop across said output rectifier, wherein said detection resistor is connected from said second terminal of said first primary winding to said detection input of said PWM controller;

a transit-voltage suppressor connected in parallel with said second primary winding; and a snubber diode connected in series with said transit-voltage suppressor.

2. The flyback power converter as claimed in claim 1, wherein the output current of the power converter and the output voltage of the power converter are regulated in such a manner that they are substantially constant.

3. The flyback power converter as claimed in claim 1, wherein said flyback voltage is reflected from said secondary winding to said first primary winding and said second primary winding of said transformer substantially rapidly after the PWM signal is turned off.

4. The flyback power converter as claimed in claim 1, wherein during the on-time of the PWM signal, a primary current of said transformer is produced, wherein said primary current of said transformer generates a current-sense voltage across said current-sense resistor.

5. The flyback power converter as claimed in claim 1, wherein a bias current pulled from said detection input of said PWM controller is modulated in proportion to the output load of the power converter.

6. The flyback power converter as claimed in claim 1, wherein the PWM signal is modulated in response to said flyback voltage sampled from said detection input of said PWM controller, wherein the modulation is performed in a manner that keeps the DC output voltage substantially constant.

7. The flyback power converter as claimed in claim 1, wherein the peak primary current of said transformer is limited in response to the voltage sampled from said detection input of said PWM controller, wherein the peak primary current of said transformer is limited in a manner that keeps the output current substantially constant.

8. The flyback power converter as claimed in claim 1, wherein said PWM controller further comprises:

a voltage detection circuit for sampling said flyback voltage from said detection input of said PWM controller, wherein said voltage detection circuit produces a hold voltage and a feedback voltage, wherein said hold voltage is the voltage sampled from said detection input of said PWM controller;

a V-limit generator for producing a limit voltage in response to said hold voltage, wherein said limit voltage is used for limiting the peak primary current of said transformer;

a PWM circuit for generating said PWM signal, wherein said PWM signal is a function of said feedback voltage, said limit voltage, and said current-sense voltage; and a pulse generator for generating a sampling pulse in response to said PWM signal, wherein said sampling pulse is used for sampling said flyback voltage.

9. The flyback power converter as claimed in claim 8, wherein said voltage detection circuit comprises:

a sample switch having an input terminal connected to said detection input of said PWM controller, wherein said sample switch is turned on and turned off by said sampling pulse;

a SH capacitor for producing said hold voltage, wherein said SH capacitor is connected to an output terminal of said sample switch;

a first SH operational amplifier having a positive terminal coupled to said SH capacitor;

a second SH operational amplifier having a positive terminal coupled to a SH reference voltage;

a SH transistor having a gate connected to an output terminal of said second SH operational amplifier, wherein said SH transistor has a source connected to a negative terminal of said second SH operational amplifier;

a SH resistor connected between said source of said SH transistor and an output of said first SH operational amplifier;

a SH current mirror having a SH input mirror transistor, a first SH output transistor, and a second SH output transistor, wherein said SH input mirror transistor is connected to a drain of said SH transistor;

a reference resistor for generating said feedback voltage, wherein said reference resistor is coupled to a drain of said second SH output transistor; and a bias current sink for generating said bias current, wherein said bias current sink has a bias input mirror transistor and a bias output mirror transistor, wherein a drain of said first SH output transistor is connected to a drain of said bias input mirror transistor, wherein a drain of said bias output mirror transistor is connected to the detection input of said PWM controller, wherein said drain of said bias output mirror transistor pulls said bias current from the detection input, wherein said bias current is generated in response to said feedback voltage.

10. The flyback power converter as claimed in claim 8, wherein said V-limit generator comprises:

a means for generating a first limit current, wherein said means for generating said first limit current comprises a VL operational amplifier, a VL transistor, and a VL input resistor;

a means for generating a second limit current, wherein said means for generating a second limit current comprises a first VL mirror transistor and a second VL mirror transistor, wherein said means for generating said first limit current is connected to a drain of said first VL mirror transistor;

a first VL current source for restricting the maximum value of said second-limit current, wherein said first VL current source is connected to a source of said first VL mirror transistor and a source of said second VL mirror transistor;

a second VL current source; and a VL output resistor for generating said limit voltage, wherein said VL output resistor is connected to said second VL current source and the drain of said second VL mirror transistor, wherein said limit voltage is produced in proportion to the magnitude of said hold voltage.

11. The flyback power converter as claimed in claim 8, wherein said PWM circuit comprises:

a feedback comparator having a positive input supplied with said feedback voltage, wherein said feedback comparator has a negative input connected to said current-sense input of said PWM controller;

a limit comparator having a positive input supplied with said limit voltage, wherein said limit comparator has a negative input connected to said current-sense input of said PWM controller;

a first PWM NAND gate having a first input connected to an output of said feedback comparator, wherein said first PWM NAND gave has a second input connected to an output of said limit comparator;

a second PWM NAND gate having a first input connected to an output of said first PWM NAND gate;

a blanking circuit for generating a blank signal to ensure a minimum on-time for said PWM signal, wherein said blanking circuit has an output terminal connected to a second input of said second PWM NAND gate;

an oscillator for generating a clock signal; and a flip-flop for supplying said PWM signal to an input terminal of said blanking circuit, wherein said flip-flop is set by said clock signal, and is reset by an output of said second PWM NAND gate.

12. The flyback power converter as claimed in claim 11, wherein said blanking circuit comprises:

a means for producing a blanking time comprising a BLK transistor, a BLK current source, a BLK capacitor, and a BLK inverter;

a BLK input inverter for supplying said PWM signal to a gate of said BLK transistor to start said blanking time, said BLK input inverter having an input supplied by said PWM signal, wherein said input of said BLK input inverter is an input terminal of said blanking circuit, wherein said blanking time starts substantially soon following every rising-edge of said PWM signal; and a BLK NAND gate for supplying said blank signal, wherein said BLK NAND gate having a first input supplied by said PWM signal and a second input connected to an output of said BLK inverter.

13. The flyback power converter as claimed in claim 8, wherein said pulse generator comprises:

a means for generating a minimum delay time having a first PG transistor, a first PG current source, a first PG capacitor, and a first PG inverter, wherein said first PG transistor has a gate supplied by said PWM signal;

a means for generating an off-time delay having a PG p-transistor, a PG n-transistor, a second PG current source, a third PG current source, and a second PG capacitor;

a means for generating a sample time having a second PG transistor, a fourth PG current source, a third PG capacitor, and a PG second inverter;

a third PG inverter having an input supplied by said PWM signal;

a PG NOR gate having a first input connected to an output of said first PG inverter and a second input connected to said second PG capacitor;

a PG NAND gate for supplying a signal to start said sample time, wherein said PG NAND gate has a first input connected to an output of said PG NOR gate, a second input connected to an output of said third PG inverter, and an output connected to a gate of said second PG transistor; and a PG AND gate for supplying said sampling pulse, wherein said PG AND gate has a first input connected to said output of said PG NOR gate, a second input connected to said output of said third PG inverter, and a third input connected to an output of said second PG inverter, wherein the pulse width of said sampling pulse is equal to the sample time.

14. The flyback power converter as claimed in claim 13, wherein said second PG capacitor and said PG p-transistor produce a charge time while said PWM signal is turned-on.

15. The flyback power converter as claimed in claim 13, wherein said PG n-transistor, said second PG capacitor, and said third PG current source produce a discharge time while said PWM signal is turned-off, wherein said discharge time is substantially proportional to said charge time.

16. A flyback power converter comprising a transformer, an output rectifier connected from a secondary winding of said transformer to an output of the flyback power converter, a switching transistor for controlling the voltage across the primary windings of the flyback power converter, wherein a drain of said switching transistor is connected to an input of the flyback power converter, a current-sense resistor for generating a current-sense voltage, wherein said current-sense resistor is connected between a source of said switching transistor and the first terminal of said first primary winding, the flyback power converter comprising:

a PWM controller for providing a PWM signal to drive a gate of said switching transistor, wherein said PWM controller has a VCC input for receiving power, a detection input for receiving a flyback voltage, a current-sense input for current detection and a GND input connected to the first terminal of said first primary winding, and said current-sense input is connected to the source of said switching transistor, wherein said PWM signal is modulated in response to a flyback voltage sampled from the detection input of said PWM controller, wherein the modulation is performed in a manner that keeps the DC output voltage substantially constant, and a peak primary current of said transformer is limited in response to the voltage sampled from the detection input of said PWM controller, and wherein the peak primary current of said transformer is limited in a manner that keeps the output current substantially constant.

17. The flyback power converter according to claim 16, further comprising a power-pin capacitor for starting said PWM controller, wherein said power-pin capacitor is connected between the VCC input and the GND input of said PWM controller.

18. The flyback power converter according to claim 16, further comprising a start-up resistor for charging said power-pin capacitor, wherein said start-up resistor is connected from the input of the flyback power converter to the VCC input of said PWM controller.

19. The flyback power converter according to claim 16, further comprising a power-pin diode connected from the second terminal of said first primary winding to the VCC input of said PWM controller.

20. The flyback power converter according to claim 16, further comprising a detection resistor for receiving a bias current to compensate for the voltage drop across said output rectifier, wherein said detection resistor is connected from the second terminal of said first primary winding to said voltage detection input of said PWM controller.

21. The flyback power converter according to claim 16, further comprising a transit-voltage suppressor connected in parallel with said second primary winding.

22. The flyback power converter according to claim 16, further comprising a snubbed diode connected in series with said transit-voltage suppressor.

* * * * *